United States Patent
Storer et al.

(10) Patent No.: US 11,914,577 B2
(45) Date of Patent: Feb. 27, 2024

(54) METHODS AND SYSTEMS FOR STORING AND ASSOCIATING OBJECTS IN A STORAGE SYSTEM

(71) Applicant: Box, Inc., Redwood City, CA (US)

(72) Inventors: Mark Storer, Redwood City, CA (US); Kirill Minkovich, Redwood City, CA (US); Xiaodong Wang, Fremont, CA (US); Susmitha Kanakamedala, Sunnyvale, CA (US)

(73) Assignee: Box, Inc., Redwood City, CA (US)

( * ) Notice: Subject to any disclaimer, the term of this patent is extended or adjusted under 35 U.S.C. 154(b) by 110 days.

(21) Appl. No.: 17/519,147

(22) Filed: Nov. 4, 2021

(65) Prior Publication Data
US 2023/0133610 A1 May 4, 2023

(51) Int. Cl.
*G06F 16/00* (2019.01)
*G06F 16/23* (2019.01)
*G06F 16/182* (2019.01)

(52) U.S. Cl.
CPC ........ *G06F 16/2379* (2019.01); *G06F 16/182* (2019.01)

(58) Field of Classification Search
CPC .......................... G06F 16/182; G06F 16/2379
USPC ........................................................ 707/703
See application file for complete search history.

(56) References Cited

U.S. PATENT DOCUMENTS

| | | | |
|---|---|---|---|
| 9,430,264 B2* | 8/2016 | Tang | G06F 9/45545 |
| 2002/0184180 A1* | 12/2002 | Debique | G06F 16/48 |
| 2005/0091690 A1* | 4/2005 | Delpuch | H04N 9/87 725/105 |
| 2019/0238619 A1* | 8/2019 | Mantrana-Exposito | H04L 63/104 |
| 2020/0005284 A1* | 1/2020 | Vijayan | H04L 63/08 |

* cited by examiner

*Primary Examiner* — Vincent F Boccio
(74) *Attorney, Agent, or Firm* — Sheridan Ross P.C.

(57) ABSTRACT

Embodiments are directed to association of storage objects in a multi-tenant, cloud-based storage environment. More specifically, a first object can be made available in the file system of the environment and can be accessed, for example, by its file or object name. At some point thereafter, an auxiliary object can be provided that is related to the first object. For example, this auxiliary object can comprise metadata or other content associated with or related to the first object. According to one embodiment, this auxiliary object can be assigned an identifier that not only uniquely identifies the auxiliary object but also identifies, within the identifier itself, the relationship to the first object. This relational naming can be used to track the relationship between objects, e.g., to update the auxiliary object based on changes to the first object, but without a separate mapping of the objects.

20 Claims, 6 Drawing Sheets

METHODS AND SYSTEMS FOR STORING AND ASSOCIATING OBJECTS IN A STORAGE SYSTEM

FIELD OF THE DISCLOSURE

Embodiments of the present disclosure relate generally to methods and systems for storing data in a cloud-based environment and more particularly to associating objects in a multi-tenant, cloud-based storage environment.

BACKGROUND

In current cloud-based storage environments, the content stack does not have a concept of associations between different objects. Rather, each object in the storage system is independent and considered a first-class user object. This can be difficult when dealing with objects that decorate or enhance other objects, i.e., meta-objects or auxiliary objects that define metadata or other additional data for the related, first-class object. For example, consider an attachment within a note, or a signature image within a signed image. Neither of these is a first-class user object that should appear in a listing of the user's content. Rather, the object only exists in the context of another object. In cloud-based storage environments, applications need to upload such an object as a first-class user file and maintain the relations between objects in some manner, e.g., by a separate mapping between objects. This has two major drawbacks. First, it can result in a strange user experience as the auxiliary object will appear in the user's file listing. Second, since no association exists on the backend of the storage system, the objects do not follow the same lifecycle events. For example, if the user deletes the original object or moves the object across a compliance boundary nothing informs the backend that the auxiliary objects should follow the same lifecycle process. This risks leaving auxiliary objects in a state that is not in compliance with the user's compliance or storage-region requirements. Hence, there is a need for improved methods and systems for associating objects in a multi-tenant, cloud-based storage environment.

BRIEF SUMMARY

Embodiments of the disclosure provide systems and methods for associating objects in a multi-tenant, cloud-based storage environment. According to one embodiment, a method for associating objects in a multi-tenant, cloud-based storage environment can comprise receiving, by an upload proxy executing on a server of the multi-tenant, cloud-based storage environment, a first object uniquely identified by an entity identifier. The upload proxy executing on the server of the multi-tenant, cloud-based storage environment can store the first object in a data repository using one or more backend services of the multi-tenant, cloud-based storage environment. The stored first object can be accessible through a file system of the multi-tenant, cloud-based storage environment using the entity identifier.

An Application Programming Interface (API) of a Storage Child Service (SCS) executing on the server of the multi-tenant, cloud-based storage environment can receive an auxiliary object related to the first object. The auxiliary object having a unique name. The SCS executing on the server of the multi-tenant, cloud-based storage environment can generate an identifier for the auxiliary object. The generated identifier for the auxiliary object can include the unique name of the auxiliary object and can also identify the auxiliary object as being related to the first object. Generating the identifier for the auxiliary object can comprise hashing the entity identifier for the first object and adding the hash of the entity identifier for the first object to the unique name for the auxiliary object. For example, the entity identifier for the first object comprises any of a file identifier for the first object, a user identifier for an owner of the first object, or a tenant identifier for one of a plurality of tenants of the multi-tenant, cloud-based storage environment. The generated identifier for the auxiliary object can further comprise an identifier of an entity type for the entity identifier and/or an indication of a namespace for an owner of the first object.

The SCS executing on the server of the multi-tenant, cloud-based storage environment, can store the generated identifier for the auxiliary object in a table. The SCS executing on the server of the multi-tenant, cloud-based storage environment, can also store the auxiliary object in the data repository using the one or more backend services of the multi-tenant, cloud-based storage environment. The auxiliary object can be accessible through the file system of the multi-tenant, cloud-based storage environment using the unique name for the auxiliary object.

The SCS executing on the server of the multi-tenant, cloud-based storage environment can further update the auxiliary object in response to a move, copy, or delete operation performed on the first object. Updating the auxiliary object can comprise scanning the table in which the generated identifier for the auxiliary object is stored, identifying a record in the table in which the generated identifier for the auxiliary object is stored based on the hash of the entity identifier for the first object, and retrieving, from the record in the table in which the generated identifier for the auxiliary object is stored, the unique name for the auxiliary object. The auxiliary object can then be updated using the retrieved unique name for the auxiliary object and the one or more backend services of the multi-tenant, cloud-based storage environment in response to the move, copy, or delete operation performed on the first object.

According to another embodiment, a system can comprise a processor and a memory coupled with and readable by the processor. The memory can store therein a set of instructions which, when executed by the processor, causes the processor to associate objects in a multi-tenant, cloud-based storage environment by receiving, by an upload proxy executed by the processor, a first object uniquely identified by an entity identifier and storing, by the upload proxy, the first object in a data repository using one or more backend services of the multi-tenant, cloud-based storage environment, wherein the stored first object is accessible through a file system of the multi-tenant, cloud-based storage environment using the entity identifier.

The instructions can further cause the processor to receive, by an API of a SCS executed by the processor, an auxiliary object related to the first object, the auxiliary object having a unique name and generate, by the SCS, wherein the unique identifier for the auxiliary object includes the unique name of the auxiliary object and also identifies the auxiliary object as being related to the first object. Generating the identifier for the auxiliary object can comprise hashing the entity identifier for the first object and adding the hash of the entity identifier for the first object to the unique name for the auxiliary object. For example, the entity identifier for the first object comprises any of a file identifier for the first object, a user identifier for an owner of the first object, or a tenant identifier for one of a plurality of tenants of the multi-tenant, cloud-based storage environment. The generated identifier for the auxiliary object can further comprise an identifier of an entity type for the entity identifier and/or an indication of a namespace for an owner of the first object.

The instructions can further cause the processor to store, by the SCS, the generated identifier for the auxiliary object in a table and store, by the SCS, the auxiliary object in the data repository using the one or more backend services of the multi-tenant, cloud-based storage environment. The auxiliary object can be accessible through the file system of the multi-tenant, cloud-based storage environment using the unique name for the auxiliary object.

The instructions can further cause the processor to update, by the SCS executing on the server of the multi-tenant, cloud-based storage environment, the auxiliary object in response to a move, copy, or delete operation performed on the first object. Updating the auxiliary object can comprise scanning the table in which the generated identifier for the auxiliary object is stored, identifying a record in the table in which the generated identifier for the auxiliary object is stored based on the hash of the entity identifier for the first object, retrieving, from the record in the table in which the generated identifier for the auxiliary object is stored, the unique name for the auxiliary object, and updating the auxiliary object using the retrieved unique name for the auxiliary object and the one or more backend services of the multi-tenant, cloud-based storage environment in response to the move, copy, or delete operation performed on the first object.

According to yet another embodiment, a non-transitory, computer-readable medium can comprise a set of instructions stored therein which, when executed by a processor, causes the processor to associate objects in a multi-tenant, cloud-based storage environment by receiving, by an upload proxy executed by the processor, a first object uniquely identified by an entity identifier and storing, by the upload proxy, the first object in a data repository using one or more backend services of the multi-tenant, cloud-based storage environment, wherein the stored first object is accessible through a file system of the multi-tenant, cloud-based storage environment using the entity identifier.

The instructions can further cause the processor to receive, by an API of a SCS executed by the processor, an auxiliary object related to the first object, the auxiliary object having a unique name, generate, by the SCS, wherein the unique identifier for the auxiliary object includes the unique name of the auxiliary object and also identifies the auxiliary object as being related to the first object, store, by the SCS, the generated identifier for the auxiliary object in a table, and store, by the SCS, the auxiliary object in the data repository using the one or more backend services of the multi-tenant, cloud-based storage environment. The auxiliary object can be accessible through the file system of the multi-tenant, cloud-based storage environment using the unique name for the auxiliary object. Generating the identifier for the auxiliary object can comprise hashing the entity identifier for the first object and adding the hash of the entity identifier for the first object to the unique name for the auxiliary object.

The instructions can further cause the processor to update, by the SCS executing on the server of the multi-tenant, cloud-based storage environment, the auxiliary object in response to a move, copy, or delete operation performed on the first object. Updating the auxiliary object can comprise scanning the table in which the generated identifier for the auxiliary object is stored, identifying a record in the table in which the generated identifier for the auxiliary object is stored based on the hash of the entity identifier for the first object, retrieving, from the record in the table in which the generated identifier for the auxiliary object is stored, the unique name for the auxiliary object, and updating the auxiliary object using the retrieved unique name for the auxiliary object and the one or more backend services of the multi-tenant, cloud-based storage environment in response to the move, copy, or delete operation performed on the first object.

Figure 1:
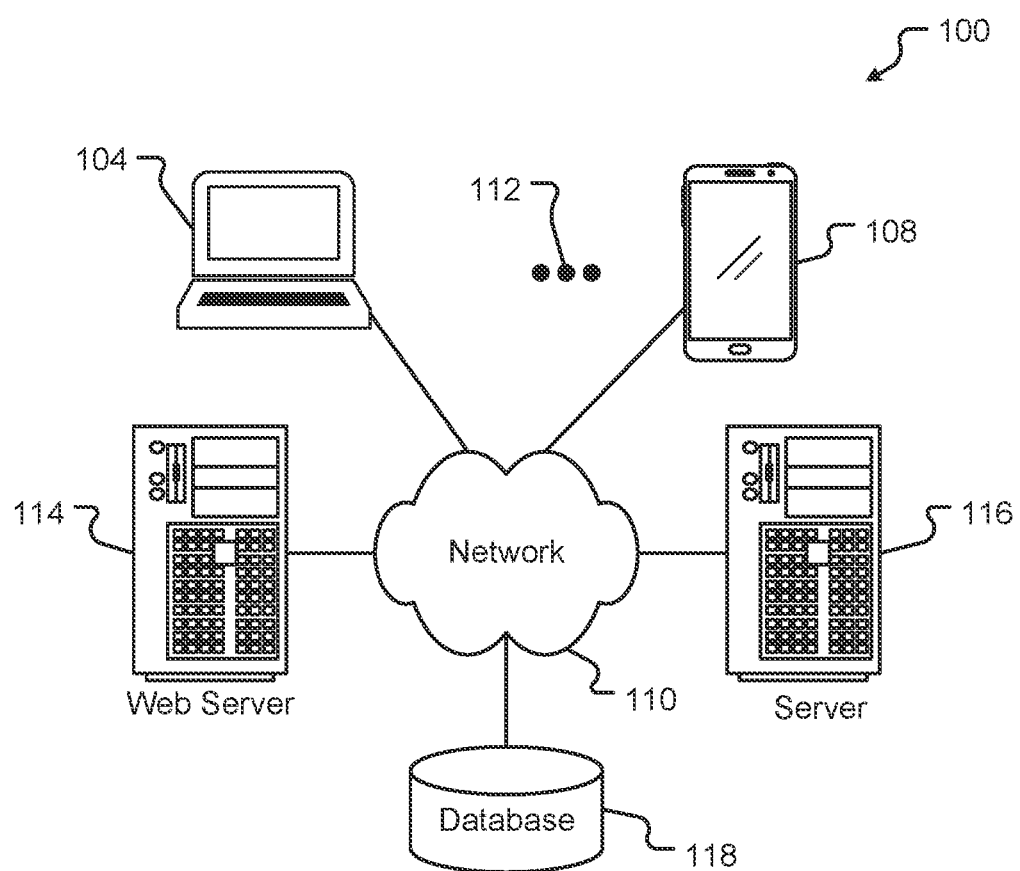
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
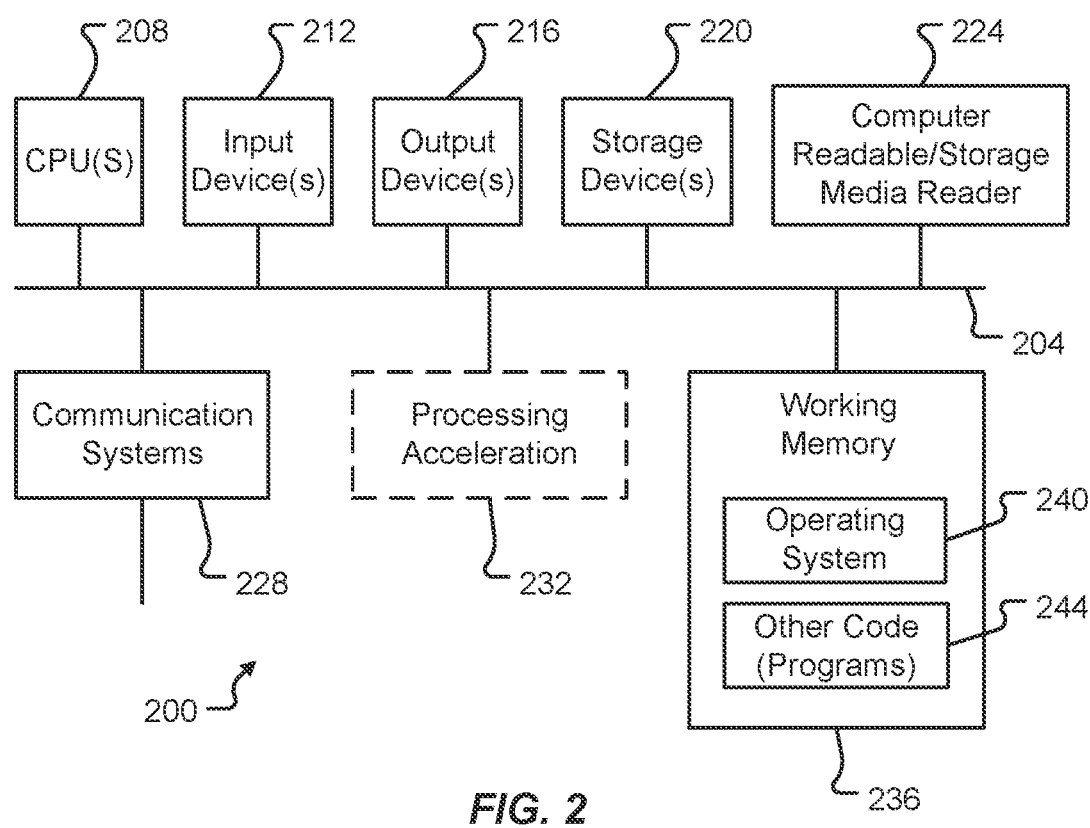
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
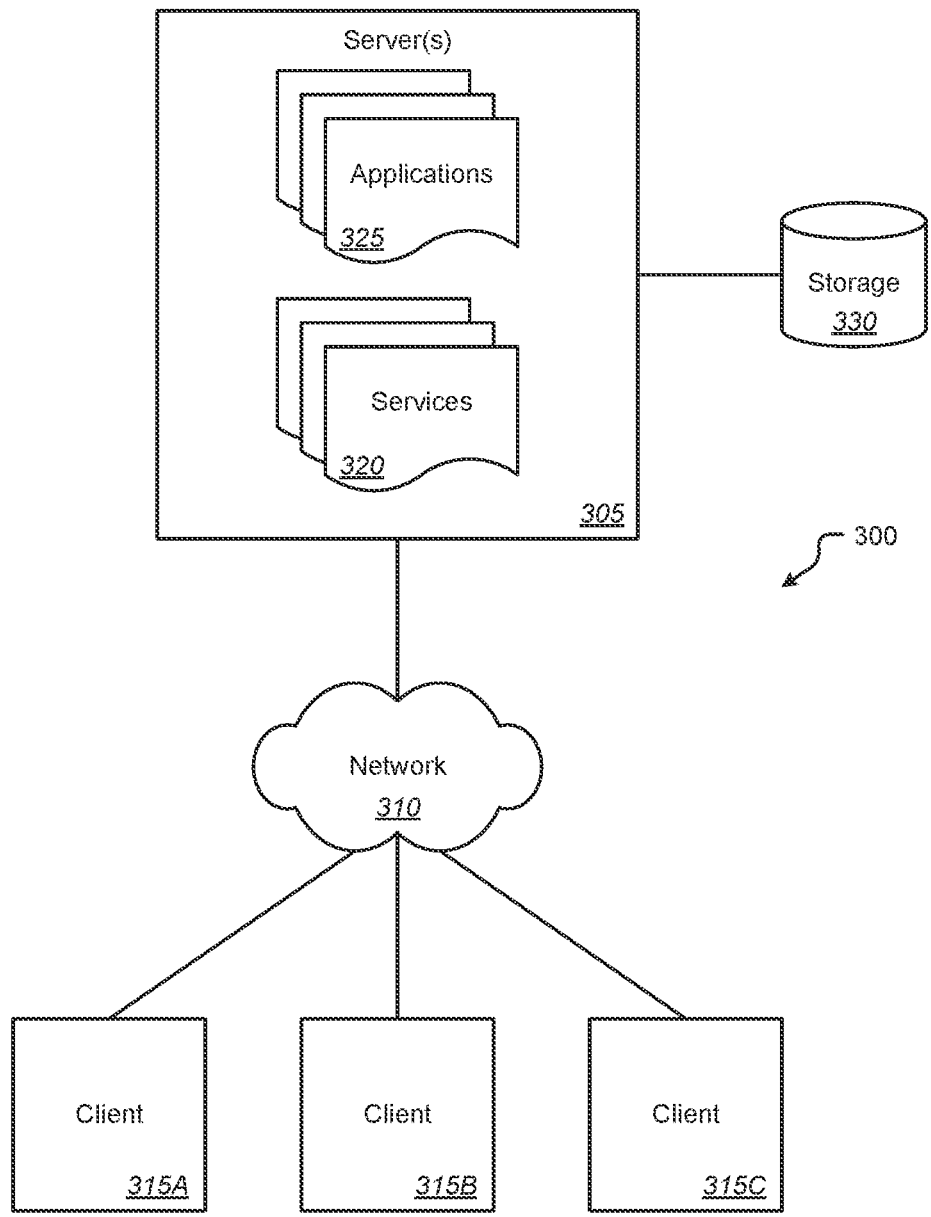
FIG. 3 is a block diagram illustrating and exemplary cloud-based storage environment in which various embodiments of the present disclosure may be implemented.

FIG. 3 is a block diagram illustrating and exemplary cloud-based storage environment in which various embodiments of the present disclosure may be implemented. As illustrated in this example, a multi-tenant, cloud-based storage environment 300 can comprise one or more servers 305 such as any one or more of the servers and/or other computing devices described above. The server(s) 305 can be communicatively coupled with one or more wired and/or wireless local and/or wide area networks 310 such as any of the networks described above. Also coupled with the network 310 can be any number of client devices 315A-315C. The client devices 315A-315C can comprise desktop computers, laptop computers, tablets, cellphones, and/or any other computing device such as described above.

Generally speaking, the server(s) can execute one or more services 320 and/or one or more applications 325 that, together, allow the client devices 315A-315C to upload content, such as files, to the server(s) 305 to be saved in storage 330 such as one or more databases and/or other repositories. Depending upon the services 320 and/or applications 325 executed by the server(s) 305, the saved content can be accessed and utilized by the client devices 315A-315C. For example, the server(s) 305 and storage 330 can provide for remote backup of data for the client devices 315A-315c. Additionally, or alternatively, the server(s) 305 may provide a collaboration environment in which a number of client devices 315A-315C may access the stored content to read and, if permitted, edit the content in a shared workspace or other environment.

Embodiments of the present disclosure are directed to a service 320 which allows association of storage objects. More specifically, once a client device 315A uploads a file or other content object to the server(s) of the multi-tenant, cloud-based storage environment 300, that first object can be made available in the file system of the environment 300. For example, it can be accessed by client devices 315A-315C, depending upon permissions, as well as services 320 and/or applications 325 executing on the server(s) 305. More specifically, the first object can be made available in the file system of the environment 300 and can be accessed, for example, by it's file or object name. At some point, a client device 315A or an application 325 executing on the server(s) 305 can provide or generate an auxiliary object that is related to the first object. For example, this auxiliary object can comprise metadata or other content associated with or related to the first object. According to one embodiment, this auxiliary object can be assigned an identifier that not only uniquely identifies the auxiliary object but also identifies, within the identifier itself, the relationship to the first object. This relational naming can be used by the service(s) 320 and/or applications 325 executing on the server(s) 305 to track this relationship, e.g., to update the auxiliary object when the first object has been updated, but without a separate mapping of the objects other than the name of the auxiliary object itself.

Figure 4:
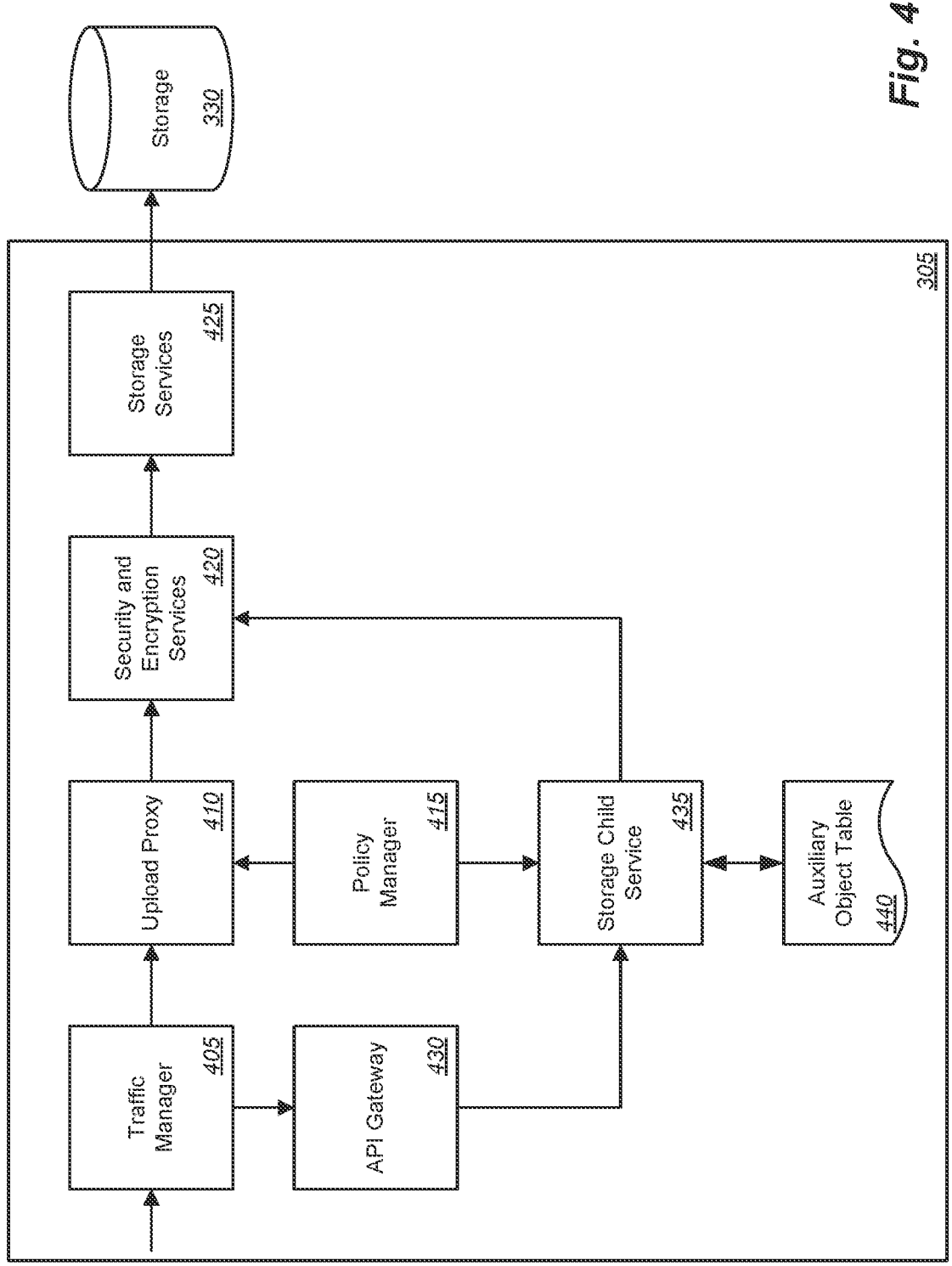
FIG. 4 is a block diagram illustrating additional details of components of a cloud-based storage environment according to one embodiment of the present disclosure.

FIG. 4 is a block diagram illustrating additional details of components of a cloud-based storage environment according to one embodiment of the present disclosure. More specifically, this example illustrates elements of the server(s) 305 of the multi-tenant, cloud-based storage environment 300 which may be executed to perform the object association and update functions introduced above. These components can include a traffic manager 405 which can receive requests and other communications from client devices 315 communicatively coupled with the server 305 and route those communications to other components. For example, the traffic manager 405 can receive a request from a client device 315A to upload a file or other content, i.e., a first object. As noted above, this first object can be uniquely identified by an entity identifier such as a file identifier, user identifier, tenant identifier, etc., or some combination thereof. Since this request is a request to upload from a client device 315A, the traffic manager 405 can route the request to an upload proxy 410.

The upload proxy 410, under restrictions and/or requirements applied by a policy manager 415, can then utilize one or more backend services 320 executed on and provided by the server(s) 305 of the multi-tenant, cloud-based storage environment 300 to store the first object in a data repository 330. For example, these services 320 can include, but are not limited to, a set of security and encryption services 420 to encrypt and/or compress the first object, a set of storage services 425 to manage a storage location and/or other aspects of storing the first content item, etc. Once stored, the stored first object can be accessible through a file system of the multi-tenant, cloud-based storage environment using the entity identifier.

Subsequently, the traffic manager 405 can receive a request from an application 325 executing on the server(s) 305 of the multi-tenant, cloud-based storage environment 300. This request can comprise a request to upload or create an auxiliary object related to the first object, e.g., a metaobject containing metadata for the first object or any other object that supplements and relates to the first object. The traffic manager 405 can route such requests to an Application Programming Interface (API) gateway 430 executing on the server 305 of the multi-tenant, cloud-based storage environment 300. The API gateway 430 can in turn route the request to a Storage Child Service (SCS) 435 executing on the server(s) 305.

As noted above, the auxiliary object can have a unique name. The SCS 435 can generate an identifier for the auxiliary object that can include the unique name of the auxiliary object and can also identify the auxiliary object as being related to the first object. More specifically, the SCS 435 can generate the identifier for the auxiliary object by hashing the entity identifier for the first object and adding the hash of the entity identifier for the first object to the unique name for the auxiliary object. For example, the entity identifier for the first object comprises any of a file identifier for the first object, a user identifier for an owner of the first object, a tenant identifier for one of a plurality of tenants of the multi-tenant, cloud-based storage environment, etc., or some combination thereof. The generated identifier for the auxiliary object can further comprise an identifier of an entity type for the entity identifier and/or an indication of a namespace for an owner of the first object.

The SCS 435 can store the generated identifier for the auxiliary object in a table 440. The SCS 435 can then utilize one or more backend services 320 executed on and provided by the server(s) 305 of the multi-tenant, cloud-based storage environment 300 to store the auxiliary object. For example, and as with the upload proxy 410, the SCS 435, can, under restrictions and/or requirements applied by a policy manager 415, utilize the security and encryption services 420 to encrypt and/or compress the first object and/or the storage services 425 to manage a storage location and/or other aspects of storing the first content item, etc. Once stored, the auxiliary object can be accessible through the file system of the multi-tenant, cloud-based storage environment using the unique name for the auxiliary object.

As noted above, the SCS 435 can further update the auxiliary object in response to a move, copy, or delete operation performed on the first object. For example, the traffic manager 405 can receive a request to move, copy, or delete the first object and the request can be carried out, for example, by the storage services 425. In response to a request from an application 325 or another element, e.g., the policy manager 415 detecting this change, the traffic manager 405 can also receive a request to update any auxiliary objects related to the first object. This request can then be carried out by the SCS 435. For example, updating the auxiliary object can be performed by the SCS 435 scanning the table 440 in which the generated identifier for the auxiliary object is stored, identifying a record in the table 440 in which the generated identifier for the auxiliary object is stored based on the hash of the entity identifier for the first object, and retrieving, from the record in the table 440 in which the generated identifier for the auxiliary object is stored, the unique name for the auxiliary object. The auxiliary object can then be updated using the retrieved unique name for the auxiliary object and the one or more backend services, such as the storage services 425, in response to the move, copy, or delete operation performed on the first object.

Figure 5:
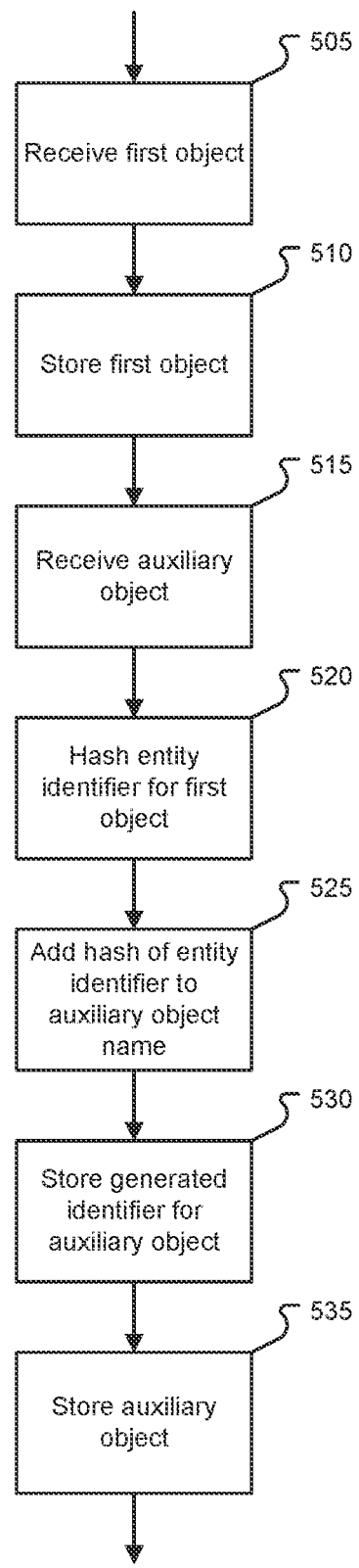
FIG. 5 is a flowchart illustrating an exemplary process for uploading and associating objects in a cloud-based storage environment according to one embodiment of the present disclosure.

FIG. 5 is a flowchart illustrating an exemplary process for uploading and associating objects in a cloud-based storage environment according to one embodiment of the present disclosure. As illustrated in this example, uploading and associating objects in a multi-tenant, cloud-based storage environment can comprise receiving 505, by an upload proxy 410 executing on a server 305 of the multi-tenant, cloud-based storage environment 300, a first object uniquely identified by an entity identifier. The upload proxy 410 can store 510 the first object in a data repository 330 using one or more backend services 420 and 425 of the multi-tenant, cloud-based storage environment 300. The stored first object can be accessible through a file system of the multi-tenant, cloud-based storage environment using the entity identifier.

An API gateway 430 of a SCS 435 executing on the server 305 of the multi-tenant, cloud-based storage environment 300 can receive 515 an auxiliary object related to the first object. The auxiliary object can have a unique name. The SCS 435 can generate an identifier for the auxiliary object. The generated identifier for the auxiliary object can include the unique name of the auxiliary object and can also identify the auxiliary object as being related to the first object. Generating the identifier for the auxiliary object can comprise hashing 520 the entity identifier for the first object and adding 525 the hash of the entity identifier for the first object to the unique name for the auxiliary object. For example, the entity identifier for the first object comprises any of a file identifier for the first object, a user identifier for an owner of the first object, or a tenant identifier for one of a plurality of tenants of the multi-tenant, cloud-based storage environment. The generated identifier for the auxiliary object can further comprise an identifier of an entity type for the entity identifier and/or an indication of a namespace for an owner of the first object.

The SCS 435 can store 530 the generated identifier for the auxiliary object in a table 440. The SCS 435 can also store 535 the auxiliary object in the data repository using the one or more backend services 420 and 425. The auxiliary object can be accessible through the file system of the multi-tenant, cloud-based storage environment using the unique name for the auxiliary object.

Figure 6:
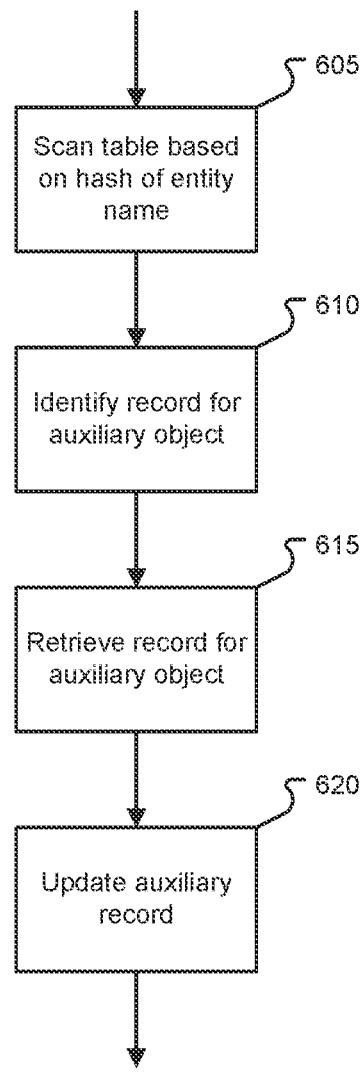
FIG. 6 is a flowchart illustrating an exemplary process for updating associated objects in a cloud-based storage environment according to one embodiment of the present disclosure.

FIG. 6 is a flowchart illustrating an exemplary process for updating associated objects in a cloud-based storage environment according to one embodiment of the present disclosure. As noted above, the SCS 435 executing on the server 305 of the multi-tenant, cloud-based storage environment 300 can further update the auxiliary object in response to a move, copy, or delete operation performed on the first object. Updating the auxiliary object can comprise scanning 605 the table 440 in which the generated identifier for the auxiliary object is stored, identifying 610 a record in the table 440 in which the generated identifier for the auxiliary object is stored based on the hash of the entity identifier for the first object, and retrieving 615, from the record in the table 440 in which the generated identifier for the auxiliary object is stored, the unique name for the auxiliary object. The auxiliary object can then be updated 620 using the retrieved unique name for the auxiliary object and the one or more backend services of the multi-tenant, cloud-based storage environment in response to the move, copy, or delete operation performed on the first object.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for associating objects in a multi-tenant, cloud-based storage environment, the method comprising:
receiving, by an upload proxy executing on a server of the multi-tenant, cloud-based storage environment, a first object uniquely identified by an entity identifier;

storing, by the upload proxy executing on the server of the multi-tenant, cloud-based storage environment, the first object in a data repository using one or more backend services of the multi-tenant, cloud-based storage environment, wherein the stored first object is accessible through a file system of the multi-tenant, cloud-based storage environment using the entity identifier;

receiving, by an Application Programming Interface (API) of a Storage Child Service (SCS) executing on the server of the multi-tenant, cloud-based storage environment, an auxiliary object related to the first object, the auxiliary object having a unique name and comprising data corresponding to the first object which is relevant only with context of the first object;

generating, by the SCS executing on the server of the multi-tenant, cloud-based storage environment, an identifier for the auxiliary object, wherein the generated identifier for the auxiliary object includes the unique name of the auxiliary object and which also identifies a relationship between the auxiliary object and the first object without an external mapping between the first object and the auxiliary object;

storing, by the SCS executing on the server of the multi-tenant, cloud-based storage environment, the generated identifier for the auxiliary object in a table; and storing, by the SCS executing on the server of the multi-tenant, cloud-based storage environment, the auxiliary object in the data repository using the one or more backend services of the multi-tenant, cloud-based storage environment, wherein the auxiliary object is accessible through the file system of the multi-tenant, cloud-based storage environment using the unique name for the auxiliary object.

2. The method of claim 1, wherein generating the identifier for the auxiliary object comprises:
hashing the entity identifier for the first object; and
adding the hash of the entity identifier for the first object to the unique name for the auxiliary object.

3. The method of claim 2, wherein the entity identifier for the first object comprises a file identifier for the first object.

4. The method of claim 2, wherein the entity identifier for the first object comprises a user identifier for an owner of the first object.

5. The method of claim 2, wherein the entity identifier for the first object comprises a tenant identifier for one of a plurality of tenants of the multi-tenant, cloud-based storage environment.

6. The method of claim 2, wherein the generated identifier for the auxiliary object further comprises an identifier of an entity type for the entity identifier and an indication of a namespace for an owner of the first object.

7. The method of claim 2, further comprising updating, by the SCS executing on the server of the multi-tenant, cloud-based storage environment, the auxiliary object in response to a move, copy, or delete operation performed on the first object.

8. The method of claim 7, wherein updating the auxiliary object comprises:
scanning the table in which the generated identifier for the auxiliary object is stored;
identifying a record in the table in which the generated identifier for the auxiliary object is stored based on the hash of the entity identifier for the first object;
retrieving, from the record in the table in which the generated identifier for the auxiliary object is stored, the unique name for the auxiliary object; and updating the auxiliary object using the retrieved unique name for the auxiliary object and the one or more backend services of the multi-tenant, cloud-based storage environment in response to the move, copy, or delete operation performed on the first object.

9. A system comprising:
a processor; and
a memory coupled with and readable by the processor and storing therein a set of instructions which, when executed by the processor, causes the processor to associate objects in a multi-tenant, cloud-based storage environment by:
receiving, by an upload proxy executed by the processor, a first object uniquely identified by an entity identifier;
storing, by the upload proxy, the first object in a data repository using one or more backend services of the multi-tenant, cloud-based storage environment, wherein the stored first object is accessible through a file system of the multi-tenant, cloud-based storage environment using the entity identifier;
receiving, by an Application Programming Interface (API) of a Storage Child Service (SCS) executed by the processor, an auxiliary object related to the first object, the auxiliary object having a unique name and comprising data corresponding to the first object which is relevant only with context of the first object;
generating, by the SCS, an identifier for the auxiliary object, wherein the identifier for the auxiliary object includes the unique name of the auxiliary object and which also identifies a relationship between the auxiliary object and the first object without an external mapping between the first object and the auxiliary object;
storing, by the SCS, the generated identifier for the auxiliary object in a table; and
storing, by the SCS, the auxiliary object in the data repository using the one or more backend services of the multi-tenant, cloud-based storage environment, wherein the auxiliary object is accessible through the file system of the multi-tenant, cloud-based storage environment using the unique name for the auxiliary object.

10. The system of claim 9, wherein generating the identifier for the auxiliary object comprises:
hashing the entity identifier for the first object; and
adding the hash of the entity identifier for the first object to the unique name for the auxiliary object.

11. The system of claim 10, wherein the entity identifier for the first object comprises a file identifier for the first object.

12. The system of claim 10, wherein the entity identifier for the first object comprises a user identifier for an owner of the first object.

13. The system of claim 10, wherein the entity identifier for the first object comprises a tenant identifier for one of a plurality of tenants of the multi-tenant, cloud-based storage environment.

14. The system of claim 10, wherein the generated identifier for the auxiliary object further comprises an identifier of an entity type for the entity identifier and an indication of a namespace for an owner of the first object.

15. The system of claim 10, further comprising updating, by the SCS executing on the server of the multi-tenant, cloud-based storage environment, the auxiliary object in response to a move, copy, or delete operation performed on the first object.

16. The system of claim 15, wherein updating the auxiliary object comprises:
 scanning the table in which the generated identifier for the auxiliary object is stored;
 identifying a record in the table in which the generated identifier for the auxiliary object is stored based on the hash of the entity identifier for the first object;
 retrieving, from the record in the table in which the generated identifier for the auxiliary object is stored, the unique name for the auxiliary object; and
 updating the auxiliary object using the retrieved unique name for the auxiliary object and the one or more backend services of the multi-tenant, cloud-based storage environment in response to the move, copy, or delete operation performed on the first object.

17. A non-transitory, computer-readable medium comprising a set of instructions stored therein which, when executed by a processor, causes the processor to associate objects in a multi-tenant, cloud-based storage environment by:
 receiving, by an upload proxy executed by the processor, a first object uniquely identified by an entity identifier;
 storing, by the upload proxy, the first object in a data repository using one or more backend services of the multi-tenant, cloud-based storage environment, wherein the stored first object is accessible through a file system of the multi-tenant, cloud-based storage environment using the entity identifier;
 receiving, by an Application Programming Interface (API) of a Storage Child Service (SCS) executed by the processor, an auxiliary object related to the first object, the auxiliary object having a unique name and comprising data corresponding to the first object which is relevant only with context of the first object;
 generating, by the SCS, an identifier for the auxiliary object, wherein the generated identifier for the auxiliary object includes the unique name of the auxiliary object and which also identifies a relationship between the auxiliary object and the first object without an external mapping between the first object and the auxiliary object;
 storing, by the SCS, the generated identifier for the auxiliary object in a table; and
 storing, by the SCS, the auxiliary object in the data repository using the one or more backend services of the multi-tenant, cloud-based storage environment, wherein the auxiliary object is accessible through the file system of the multi-tenant, cloud-based storage environment using the unique name for the auxiliary object.

18. The non-transitory, computer-readable medium of claim 17, wherein generating the identifier for the auxiliary object comprises:
 hashing the entity identifier for the first object; and
 adding the hash of the entity identifier for the first object to the unique name for the auxiliary object.

19. The non-transitory, computer-readable medium of claim 18, further comprising updating, by the SCS executing on the server of the multi-tenant, cloud-based storage environment, the auxiliary object in response to a move, copy, or delete operation performed on the first object.

20. The non-transitory, computer-readable medium of claim 19, wherein updating the auxiliary object comprises:
 scanning the table in which the generated identifier for the auxiliary object is stored;
 identifying a record in the table in which the generated identifier for the auxiliary object is stored based on the hash of the entity identifier for the first object;
 retrieving, from the record in the table in which the generated identifier for the auxiliary object is stored, the unique name for the auxiliary object; and
 updating the auxiliary object using the retrieved unique name for the auxiliary object and the one or more backend services of the multi-tenant, cloud-based storage environment in response to the move, copy, or delete operation performed on the first object.

* * * * *